United States Patent [19]
Kühn

[11] 3,748,039
[45] July 24, 1973

[54] CONTACT COPYING APPARATUS
[76] Inventor: Udo Kühn, 29 Kirchgasse, Wiesbaden, Germany
[22] Filed: Apr. 16, 1971
[21] Appl. No.: 134,593

[30] Foreign Application Priority Data
Apr. 16, 1970 Germany.................. P 20 18 224.5

[52] U.S. Cl.......................... 355/106, 271/9, 355/97
[51] Int. Cl. .......................................... G03b 27/30
[58] Field of Search...................... 355/97, 104, 106, 355/111, 90; 271/9

[56] References Cited
UNITED STATES PATENTS

| | | |
|---|---|---|
| 3,397,630 | 8/1968 | Pratt .................................. 355/106 |
| 3,273,883 | 9/1966 | Baronnie............................... 271/9 |
| 3,547,538 | 12/1970 | Yanagawa............................ 355/106 |
| 3,257,925 | 6/1966 | Ashburner .......................... 355/106 |
| 3,211,451 | 10/1965 | Masterson....................... 355/106 X |
| 3,416,863 | 12/1968 | Ralston.......................... 355/106 X |

FOREIGN PATENTS OR APPLICATIONS

| | | | |
|---|---|---|---|
| 943,401 | 12/1963 | Great Britain...................... 355/106 |
| 1,184,214 | 12/1964 | Germany .............................. 355/104 |
| 377,648 | 6/1964 | Switzerland......................... 355/106 |

*Primary Examiner*—Fred L. Braun
*Attorney*—James E. Bryan

[57] ABSTRACT

A contact copying apparatus having a rotatable copying cylinder and a feeding member for an original and a copying material, wherein the feeding member surrounds a portion of the periphery of the cylinder. The feeding member has a reversible feed direction, whereby the original can be passed to the copying cylinder from either of two sides. The apparatus also has an additional feeding member for the original which extends from the front to the rear side of the apparatus and cooperates with the reversible feeding member.

10 Claims, 2 Drawing Figures

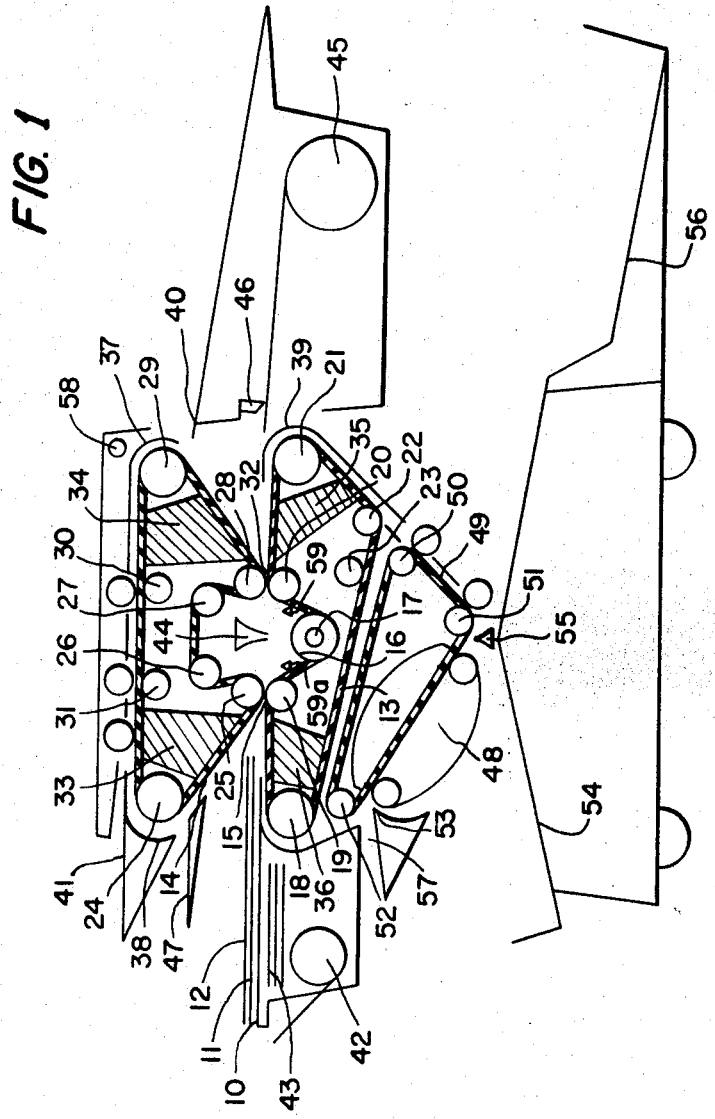

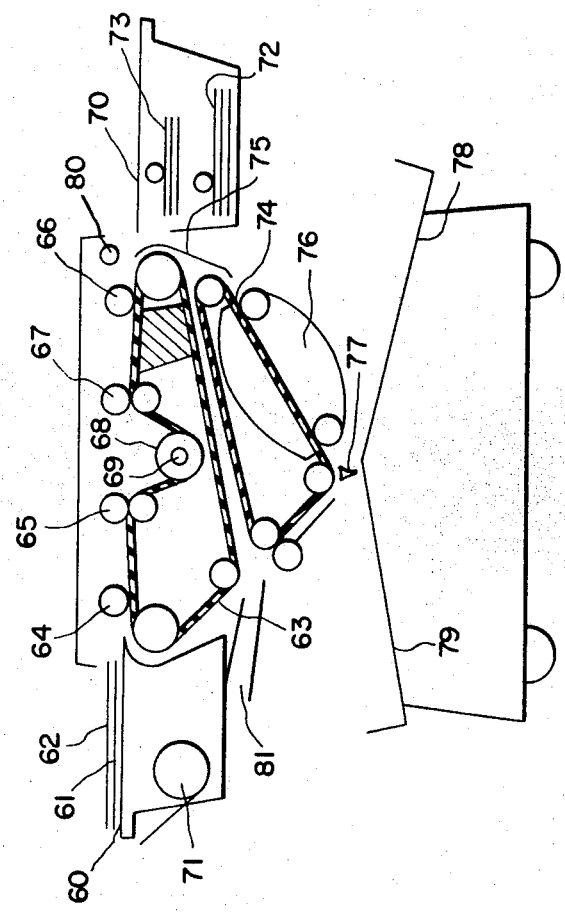

CONTACT COPYING APPARATUS

This invention relates to a contact apparatus with a rotating copying cylinder and at least one feeding means for the original and the copying material, which means surrounds part of the periphery of the cylinder.

In such apparatus, e.g., photoprinting apparatus, a transparent original is conveyed in contact with a light-sensitive copying material by a feeding means, e.g., a conveyor belt or a number of parallel conveyor belts, around the exposure or copying cylinder. After exposure, the original and the exposed copying material preferably are automatically separated, the original is ejected towards the operator's side of the apparatus and the copying material is fed through a development section and then collected as a finished copy in a container.

The unexposed copying material is taken either manually or automatically from a supply and fed, together with the original, into the exposure section of the apparatus. For copying originals of dimensions other than standard or of particularly large dimensions, the copying material generally is not fed as a sheet but from a supply roll and cut in correspondence with the length of the original. In order to satisfy all practical requirements, it thus would be necessary to store the copying material in the form of sheets of different standard sizes as well as in the form of rolls of different widths in a suitable part of the copying apparatus. Becasue of lack of space, this requirement never can be met completely. The photoprinting apparatuses used in practice thus normally operate either with one or several sheet stacks or with a supply roll. Also, an apparatus is known that can operate with several sipply rolls.

Such problems, of course, primarily apply to apparatuses with automatic feeding of the copying material. But also in the case of apparatuses with manual feeding of the copying material, the supply at the operator's side generally is limited to a few sheet sizes or to one supply roll.

When an original of a size other than that of the copying material must be copied in such a copying apparatus, it is possible either to employ the next larger size of copying material, which means a waste of material or to dispense with automatic feeding by taking the appropriate size from a separate supply and introducing it manually.

The present invention provides a preferably automatically operating high-speed contact copying apparatus which permits the production of single copies or a plurality of copies of originals of very different sizes, with particularly safe and gentle feed of the original as well as the use of a simply constructed copying cylinder.

The novel contact copying apparatus has a rotating copying cylinder and at least one feeding means for the original and the copying material, the feeding means surrounding part of the periphery of the cylinder. The feed direction of the feeding means is reversible and the original, therefore, can be conveyed or passed to the copying cylinder from either of two sides.

The feeding means may consist, in known manner, of a number of roller pairs or the like, for example. Preferably, it consists of a known endless conveyor belt or a number of parallel endless conveyor belts.

A preferred embodiment of the apparatus has, at least on one feeding side, devices for automatic feeding of copying materials of different sizes.

This apparatus may be so constructed that, from one side, the copying material is fed in the form of sheets of at least one size and, from the other side, it is fed from at least one supply and cut.

In another preferred embodiment of the copying apparatus of the invention, the device for automatic feeding of the copying material is arranged at the rear side of the apparatus and an additional feeding means, preferably an air-permeable conveyor belt system, is provided for the original, when feeding means extends from the front to the rear side of the apparatus where it contacts the feeding means for the original and the copying material. The feed direction and feed speed of the additional feeding means are attuned to those of the feeding means for the original and the copying material.

The copying apparatus of the invention advantageously also may be constructed as a step-and-repeat copying apparatus in that the additional feeding means is so constructed that it additionally contacts the feeding means for the original and the copying material at a point between the copying cylinder and the front of the apparatus and that means for separating the original and the copying material are provided behind both contact points.

The copying apparatus of the invention permits considerable automation and simpler operation, which has been impossible with the hitherto known copying apparatuses. It permits wide variation in the size of the copies so that it is possible to make copies of originals of practically all standard sizes without the copying material having to be manually selected or cut.

Further simplification of operation of the apparatus of the invention provides an embodiment in which the copying procedure is automatically controlled by perforated order cards. The order cards may contain, e.g., the number of copies, if required or desired, the kind and size of the copying material and other data. By means of a suitable recording device, it is possible to automatically determine the costs for the execution of the copying order.

The apparatus of the invention furthermore permits particularly rapid and safe processing of considerably large originals since these originals, after exposure, may be ejected either towards the operator's side or towards the rear side of the apparatus. When they are ejected towards the operator's side, as is usual, large originals must be received by the operator manually. When they are ejected towards the back side, as is possible with the apparatus of the invention, the collecting trough may be so dimensioned to collect also large originals without damaging them. In this case, the operator may introduce the originals successively within a short time so that the operating speed is substantially increased. The selection of the direction of ejection is independent of the feed direction of the feeding means.

The feeding means with reversible feed direction in accordance with the invention preferably is either a single endless perforated belt or a number of parallel endless perforated belts. The feed of the copying material and of the original through the exposure station is carried out in this case in that the conveying belt system is hermetically closed at the front ends and air is drawn from the interior through the perforations or through the slits between the strip-like belts. When using strip-like belts, it is advantageous to tighten each strip individually in a suitable manner in order to compensate for different elongation during operation.

The apparatus of the invention either may be fed from two sides or, when the copying material is fed automatically at least on one side, the apparatus may be preferably operated always from one side by means of the additional feeding means for the original. In this case, the original is either fed together with the copying material from the operator's side to the copying cylinder or is placed on the same side onto the additional feeding means for the original, conveyed therefrom to the rear side of the apparatus, united there with the automatically fed copying material and passed to the feeding means for the original and the copying material, which conveys both sheets from the rear side through the copying zone.

When the additional feeding means also is an internally evacuated conveying belt system, it may serve to separate the original introduced from the front from the copying material after expsoure and to eject it either towards the front or towards the rear side of the apparatus.

As indicated above, the additional conveyor belt system may be arranged substantially symmetrically with respect to the copying cylinder and in contact with the first conveyor belt system in front of and behind the copying cylinder. In this case, the original may be separated from the copying material after passing the copying cylinder by appropriate control of the suction and optionally, by returned via the conveyor belt system to the initial position and copied again or ejected towards the front or rear side.

This procedure of returning the original via the additional conveyor belt has the particular advantage that, in this case, originals up to a length of about 1 m and more may be automatically repeated. In the hitherto known step-and-repeat copying apparatuses, the original has been returned to the exposure station by holding or sucking upon the copying cylinder, the length of the original, of course, being limited by the diameter of the copying cylinder.

In accordance with the present invention, it is now even possible to construct the copying cylinder substantially smaller than it has been usual hitherto, preferably with a diameter below 10 cm. Copying cylinders of this size can be manufactured substantially more inexpensively than the hitherto conventional ones of a diameter of about 10 to 20 cm. When using a high-power light source, e.g., a high-pressure mercury vapor lamp which requires intensive cooling, this cooling advantageously is performed by blowing air onto the cylinder from the outside.

The copying cylinders of conventional photoprinting machines are cooled from the interior by means of an air stream. In order to prevent the cooling air from impairing the efficiency of the light source, the lamp is in an additional enveloping tube, usually of quartz. This enveloping tube may be omitted when the copying cylinder is cooled from the outside.

External cooling has the further advantage that the inner side of the cylinder is not contaminated by dust particles entrained by the cooling air. By omitting the enveloping tube, the intensity of illumination of the copying material is increased. Another considerable increase of the intensity of illumination is achieved by using a smaller copying cylinder.

When a smaller original must be repeated, the length of which is only part of the circulation path of the additional conveyor belt system, it is possible, for adjusting a shorter circulation time, to adjust an increased travel speed which becomes effective when the end of the original has left the copying cylinder and until the leading edge reaches it for repeated exposure.

The apparatus part above the copying cylinder advantageously is so constructed that it is tiltable at one side so that it may be tilted upwardly. In this manner, the copying cylinder is easily accessible in the case of malfunction or for cleaning.

When the copying apparatus of the invention, in addition to the described exposure section, contains a development section for the exposed copying material, this section advantageously is arranged beneath the exposure section so that the upper part thereof can be opened in the described manner.

In the case of photoprinting apparatus, development is carried out in the usual manner either with an alkaline developer solution or with wet ammonia. Development advantageously may be carried out according to the principle described in U. S. Pat. No. 3,440,944, according to which the ammonia gas is blown onto the surface to be developed and drawn through the conveying surface, which advantageously again is a perforated conveyor belt. 24

Exemplary embodiments of the contact copying apparatus are illustrated in FIGS. 1 and 2.

FIG. 1 is a view in longitudinal section through a preferred embodiment of a contact copying apparatus in accordance with the present inventing and FIG. 2 is a view in longitudinal section through a simplified embodiment of the contact copying apparatus of the present invention.

FIG. 1 shows a combined photoprinting apparatus with an exposure section and a development section. On the operating table 10, there is the copying material sheet 11 and thereabove the original to be copied 12. Both sheets are placed between the conveyor belts 13 and 14 circulating around the rollers 18 to 23 and 24 to 31, respectively. The sheets are gripped at the contact point 15. They are conveyed along the exposure cylinder 16 in the center of which is the light source 17, e.g., a high-pressure mercury vapor lamp. The exposure cylinder 16 is cooled by blowing air thereon from the slot 44. The exposure time is regulated by adjusting the feed speed. After passing the exposure station, the original 12 and the copying material 11 are separated at the separation point 32.

The endless, preferably perforated conveyor belts 13 and 14 may be of one piece or of a number of parallel strips. At the front ends, the column-shaped space surrounded by each conveyor belt is enclosed by walls so that this space is connected with the ambient air only by the perforations or the slits between the strips. Suction lines are introduced into the front ends through which lines the air is drawn off from the interior. In this manner, the copying material 11 and the original 12 are firmly sucked onto the corresponding conveyor belts 13 and 14, respectively. The drawing diagrammatically illustrates the zones in which the conveyor belts are under suction by the hatched surfaces 33, 34, 35, and 36. In addition to the suction zones, the baffles 37, 38, and 39 are provided for feeding the original and/or the copying material.

After separation from the copying material 11, the original 12 is either ejected from the conveyor belt 14 by suitable adjustment of the suction and the baffles into the rearward collecting trough 40 or further conveyed along the rolls 29, 30, and 31 and ejected towards the operator's side onto the table 47.

The exposed copying material 11 is conveyed by the conveyor belt 13 and removed in the zone of the baffle 39 by interrupting the suction. By means of the baffle 39, it is then fed onto the conveyor belt 49, which may be constructed in the same manner as the belts 13 and 14. The conveyor belt 49 which travels over the rolls 50, 51, and 52 conveys the copying material through the development section 48. In the present case, development is performed with heated wet ammonia gas which advantageously is blown onto the surface of the copying material and drawn through the perforated conveying belt. After leaving the development zone, the developed copy is separated from the conveyor belt 49 and guided into the collecting trough 54 by means of the baffle 53.

The supply of copying material is in the form of a roll 42 and of one or more sheet stacks 43 beneath the operating table 10. When introducing the original 12, and in dependence upon the size thereof, the copying material is drawn either manually from the roll 42 and cut to the appropriate length or fed by an automatic feeding device, not shown, and fed together with and exactly beneath the original of the same dimensions.

The copying apparatus may be fed from the table 41. In this case, the feed direction of the three conveyor belts 13, 14 and 49 is reversed so that the belts 13 and 49 circulate counterclockwise and the belt 14 clockwise. The original is then gripped by the belt 14, conveyed to the contact point 32 and united there with the copying material automatically conveyed from the supply roll 45. On its way over the belt 14, the original passes suitable photoelectrical or mechanical switches, not shown, controlling the supply of the copying material fom the roll 45 and the cutting device 46 cutting the copying material correspondingly to the length of the original. The original and the copying material then pass the copying cylinder in the reversed direction and are separated at 15. The orignal either may be ejected onto the table 47, or after turnng up the baffle 37, into the trough 40. When the copy is to be repeated, the original remains on the conveyor belt 14 and is again united at 32 with a sheet of copying material. 1

When making several copies from an original, it is also possible to actuate the switches 59 and 59a arranged at a short distance in front of and behind the exposure zone. These switches control the circulation speed of the belts 13 and 14. When a relatively short original is to be copied, two circulation speeds are preselected: the highest possible circulation speed and the speed necessary for a proper exposure time. The original and the sheet of copying material enter the copying apparatus at the highest possible speed until their leading edges pass the switch 59. The exposure speed is switched on and maintained until the rear edges of the original and the copying material have passed the switch 59a. The apparatus also may be so operated, of course, that the highest possible speed is switched on for the first time when the first exposure has taken place and becomes effective each time during the return of the original to the exposure station.

The exposed copying material is passed from the conveyor belt 13 in the zone of the rolls 18 and 52 to the conveyor belt 49 and conveyed thereby through the development section 48. Development of the copy takes place as described above. By means of the adjustable baffle 55, the copy optionally may be ejected into one of the troughs 54 and 56.

The supply of copying material at the rear side of the apparatus advantageously is composed of other sizes, e.g., the roll 45 with another width and/or at least one stack of another sheet size, than those mounted below the table 10.

When an exposed sheet of copying material is to be developed only or when development is to be repeated, the sheet may be introduced manually through the gap 57.

The upper part of the copying apparatus containing the conveyor belt 14 is pivotal about the axis 58 so that the copying cylinder 16 is accessible by simply turning up this part. FIG. 2 shows a simplified embodiment of the photoprinting apparatus of the invention which is operated from two sides. On the operating table 60, there are the copying material 61 taken fom the supply roll 71 and the original 62. They are placed manually into the exposure section, superimposed, and conveyed by the conveyor belt 63 along the exposure cylinder 68, in the center of which is the light source 69. The light source may be a high-pressure mercury vapor lamp or one or more fluorescent lamps When using several fluorescent lamps as the light source, the exposure cylinder may have a larger diameter, i.e., above 10 cm. For producing a good contact with the conveyor belt 63 and, if desired, for separating the original from the copying material after exposure, a number of contact rolls are provided which are represented by the rolls 64 to 67. The original 62 and the copying material 61 are separated from one another in a suitable manner after passing the roll 66. The original 62 is ejected onto the table 70. The exposed copying material 61 is further conveyed by the conveyor belt 63 and, in the zone of the baffle 75, passed to the conveyor belt 74 which conducts it through the development zone 76. The finished copy is then passed into one of the collecting troughs 78 and 79 by means of the adjustable baffle 77. This working method of the apparatus may serve for the production of copies of large originals where manual introduction of the copying material is necessary or advantageous due to the length of the original.

When copies of smaller originals, particularly those of standard sizes, are to be produced, the direction of rotation of the conveyor belt 63 is reversed so that it circulates counterclockwise. The original is then introduced via the table 70 under which there are stacks of sheets of copying material of different standard sizes 72 and 73. When introducing the original, the appropriate size of copying material is selected and the sheet is placed onto the belt 63 by suitable known synchronization measures so that it is exactly beneath the original. The copying operation proceeds analogoulsy in the direction opposite to the direction above. The exposed copying material is passed from the conveyor belt 63 in the zone of the baffle 75 to the conveyor belt 74, the direction of rotation of which is not changed. Development and ejection take place as described above.

The upper part of the apparatus is pivotal about the axis 80 so that the copying cylinder is easily accessible.

It will be obvious to those skilled in the art that many modifications may be made within the scope of the present invention without departing from the spirit thereof, and the invention includes all such modifications.

What is claimed is:

1. In a contact copying apparatus having front and rear sides, a rotatable copying cylinder and a feeding means for an original and a copying material, said means surrounding a portion of the periphery of the cylinder, the improvement which comprises feeding means having a reversible feed direction whereby the original can be passed to the copying cylinder from either the front or the rear side of the apparatus, and automatic feeding means mounted at the rear side of the apparatus for automatically feeding copying materials of different sizes, said automatic feeding means including additional fedding means for the original, the additinal feeding means extending from the front to the rear side of the apparatus where it contacts the feeding means for the original and the copying material.

2. An apparatus according to claim 1 in which the reversible feeding means comprises a conveyor belt.

3. An apparatus according to claim 2 in which the conveyor belt is a plurality of parallel belts.

4. An apparatus according to claim 1 in which the additional and reversible feeding means each comprises a perforated belt and the apparatus includes means for exhausting air from a space surrounded by said belts.

5. An apparatus according to claim 1 in which the additional reversible feeding means contacts the feeding means for the original and the copying material additionally at a point between the copying cylinder and the front of the apparatus, and including means for separating the original and the copying material behind both contact points.

6. An apparatus according to claim 5 in which the additional feeding means is a perforated conveyor belt system includng means for exhausting air from the surrounding space.

7. An apparatus according to claim 1 including means adjacent to the automatic feeding means for cutting copying material drawn from a one supply roll.

8. An apparatus according to claim 1 in which the copying cylinder has a diameter less than 10 cm.

9. An apparatus according to claim 1 in which part of the apparatus above the copying cylinder is pivotal.

10. An apparatus according to claim 1 including mans for blowing air onto the exterior of the copying cylinder.

* * * * *